US008865020B2

(12) United States Patent
Suzuki et al.

(10) Patent No.: US 8,865,020 B2
(45) Date of Patent: Oct. 21, 2014

(54) ALUMINUM SILICATE COMPLEX AND HIGH-PERFORMANCE ADSORBENT COMPRISING THE SAME

(75) Inventors: Masaya Suzuki, Ibaraki (JP); Katsuhiro Tsukimura, Ibaraki (JP); Sumiko Kawabata, Ibaraki (JP); Chieko Ikeda, Ibaraki (JP); Ryousuke Nakanishi, Aichi (JP); Koji Tajiri, Aichi (JP); Keiichi Inukai, Aichi (JP); Masaki Maeda, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 12/810,533

(22) PCT Filed: Dec. 26, 2008

(86) PCT No.: PCT/JP2008/073735
§ 371 (c)(1),
(2), (4) Date: Aug. 23, 2010

(87) PCT Pub. No.: WO2009/084632
PCT Pub. Date: Jul. 9, 2009

(65) Prior Publication Data
US 2010/0320418 A1 Dec. 23, 2010

(30) Foreign Application Priority Data

Dec. 27, 2007 (JP) .................................. 2007-336403
Apr. 11, 2008 (JP) .................................. 2008-103658

(51) Int. Cl.
*C09K 3/00* (2006.01)
*B01J 20/16* (2006.01)
(Continued)

(52) U.S. Cl.
CPC .......... *B01D 53/02* (2013.01); *B01D 2257/406* (2013.01); *Y02C 20/20* (2013.01);
(Continued)

(58) Field of Classification Search
USPC ............... 252/194; 423/327.1, 328.1; 502/63, 502/407, 408
See application file for complete search history.

(56) References Cited

U.S. PATENT DOCUMENTS

| 4,152,404 A | 5/1979 | Farmer |
| 4,959,338 A | 9/1990 | Miura et al. |

(Continued)

FOREIGN PATENT DOCUMENTS

| CN | 1326787 A | 12/2001 |
| JP | 61-257234 A | 11/1986 |

(Continued)

OTHER PUBLICATIONS

B.A. Goodman, J.D. Russell, B. Montez, Eric Oldfield and R.J. Kirkpatrick, Structural Studies of Imogolite and Allopbanes by Aluminum-27 and Silicon-29 Nuclear Magnetic Resonance Spectroscopy, Phys Chem Minerals (1985) 12:342-346.*

(Continued)

*Primary Examiner* — Bijan Ahvazi
(74) *Attorney, Agent, or Firm* — Howson & Howson LLP (57) ABSTRACT

Provided is an adsorbent having superior adsorption properties for use as a dehumidifying agent for desiccant air conditioning which exhibits high adsorption properties at mid and high humidity ranges, and for use as a gas adsorbent of carbon dioxide, ammonia, formaldehyde and the like. A precursor suspension having a Si/Al ratio of 0.70 to 1.0 is prepared, and the precursor suspension is subsequently heated at 110° C. or higher for 2 days to synthesize a complex of a layered low-crystalline clay mineral and an amorphous aluminum silicate. The obtained complex of the layered low-crystalline clay mineral and the amorphous aluminum silicate yields excellent water vapor adsorption performance of 45 wt % or more at a relative humidity of 60%, and therefore can be used as an adsorbent for desiccant air conditioning. The complex also yields excellent carbon dioxide absorption/desorption performance of 12 wt % or more at 100 kPa to 900 kPa, and therefore can be used as a gas adsorbent for gas such as ammonia and formaldehyde.

3 Claims, 4 Drawing Sheets

(51) Int. Cl.
*B01D 53/02* (2006.01)
*C01B 33/26* (2006.01)
*C01B 33/40* (2006.01)
*B01D 53/28* (2006.01)
*B01J 29/06* (2006.01)
*B01D 53/047* (2006.01)

(52) U.S. Cl.
CPC ............ *B01J 20/16* (2013.01); *B01D 2253/11* (2013.01); *B01D 53/047* (2013.01); *B01D 2253/106* (2013.01); *B01D 2257/70* (2013.01); *B01D 2257/90* (2013.01); *B01D 2253/104* (2013.01); *B01D 2257/7022* (2013.01); *B01D 2257/504* (2013.01); *Y02C 10/08* (2013.01); *C01B 33/26* (2013.01); *C01B 33/40* (2013.01); *B01D 53/28* (2013.01)
USPC ............ 252/194; 423/327.1; 423/328.1; 502/63; 502/407; 502/408

(56) References Cited

U.S. PATENT DOCUMENTS

| | | | |
|---|---|---|---|
| 6,254,845 | B1 | 7/2001 | Ohashi et al. |
| 7,887,770 | B2 | 2/2011 | Suzuki et al. |
| 2010/0028237 | A1 | 2/2010 | Suzuki et al. |
| 2010/0113265 | A1* | 5/2010 | Suzuki et al. .................. 502/408 |
| 2011/0189070 | A1 | 8/2011 | Suzuki et al. |

FOREIGN PATENT DOCUMENTS

| | | | | |
|---|---|---|---|---|
| JP | 05-170426 | A | | 7/1993 |
| JP | 2000-128520 | A | | 5/2000 |
| JP | 2001-064010 | A | | 3/2001 |
| JP | 2001-220129 | A | | 8/2001 |
| JP | 2002-095926 | A | | 4/2002 |
| JP | 2002-121018 | A | * | 4/2002 .............. C01B 33/36 |
| JP | 2002-121018 | A | | 4/2002 |
| JP | 2003-019435 | A | | 1/2003 |
| JP | 2004-059330 | A | | 2/2004 |
| JP | 2004-224583 | A | | 8/2004 |
| JP | 2004-345892 | A | | 12/2004 |
| JP | 2005-040753 | A | | 2/2005 |
| JP | 2005-314165 | A | | 11/2005 |
| JP | 2006-240956 | A | | 9/2006 |
| JP | 2008-179534 | A | | 8/2008 |
| WO | 2008/081605 | A1 | | 7/2008 |
| WO | 2008/129968 | A1 | | 10/2008 |

OTHER PUBLICATIONS

W.C. Ackerman et al., "Gas/Vapor Adsorption in Imogolite: A Microporous Tabular Aluminsilicate", Langmuir—The ACS Journal of Surfaces and Colloids, vol. 9, No. 4, pp. 1051-1057, Apr. 1993.
W.C. Ackerman et al., "Adsorption Studies of Pure and Modified Imogolite as a Potential Pore Size Standard", Characterization of Porous Solids III—Studies in Surface Science and Catalysts, vol. 87, pp. 735-744, Jul. 1994.
M.A. Wilson et al., "Thermal Transformations of Synthetic Allophane and Imogolite as Revealed by Nuclear Magnetic Resonance", Clay Minerals, vol. 23, pp. 175-190, 1988 (month unknown).
V.C. Farmer et al., "Synthetic Allophane and Layer-Silicate Formation in $SiO_2$—$Al_2O_3$—FeO—$Fe_2O_3$—MgO—$H_2O$ Systems at 23 degrees C and 89 degrees C in a Calcareous Environment", Clays and Clay Minerals, vol. 39, No. 6, pp. 561-570, 1991 (month unknown).
A. McCutcheon et al., "29Si Labeled Nanoaluminosilicate Imogolite", Journal of Non-Crystalline Solids, vol. 351, pp. 1967-1972, Jun. 23, 2005.
R.V. Sriwardane et al., "Adsorption of CO2, N2, and O2 on Natural Zeolites", Energy & Fuels, vol. 17, pp. 571-576, Mar. 19, 2003.

* cited by examiner

ALUMINUM SILICATE COMPLEX AND HIGH-PERFORMANCE ADSORBENT COMPRISING THE SAME

TECHNICAL FIELD

The present invention generally relates to a substance, in which its application as an innovative functional material is expected, that yields superior physicochemical characteristics such as high-specific surface area, high pore volume, ion exchange performance, and adsorption performance based on a microstructure resulting from a unique shape in the field of nanotechnology, in which its practical application is strongly expected, as the important fundamental technology that will support the next-generation industry. In particular, the present invention relates to a complex of a layered low-crystalline clay mineral and an amorphous aluminum silicate having superior water vapor adsorption/desorption properties, and an adsorbent using such complex.

BACKGROUND ART

A nano-sized tubular aluminum silicate is naturally produced as an imogolite, and an imogolite exists in soil, and is primarily produced in soil deriving from volcanic ash. Moreover, a natural imogolite, together with allophane as the related mineral, affects the transfer of nutrients and water in the soil and their supply to plants, and also affects the accumulation and residue of hazardous contaminated substances. The foregoing tubular aluminum silicate has, as its primary constituent elements, silicon (Si), aluminum (Al), oxygen (O) and hydrogen (H), and is a hydrated aluminum silicate assembled from numerous Si—O—Al bonds of a tubular shape having an outer diameter of 2.2 to 2.8 nm, an inner diameter of 0.5 to 1.2 nm, and a length of 10 nm to several μm, and is naturally a clay constituent distributed in the soil having as its base material ash fall ejecta such as volcanic ash and pumice.

A protoimogolite is a precursor substance of the imogolite, and becomes an imogolite by heating the precursor dispersed in an aqueous solution at approximately 100° C. Thus, the precursor substance during the process of forming the imogolite is referred to as a protoimogolite. Since a protoimogolite has properties that derive from the imogolite structure, it shows the same peak as imogolite at −78 ppm in a $^{29}$Si solid state NMR, and the silicon has a coordination of OH—Si—(OAl)$_3$. Consequently, an imogolite and a protoimogolite have roughly the same adsorption behavior at a relative humidity of 20% or less even regarding water vapor adsorption characteristics, and, although the protoimogolite does grow to a relatively long tube shape as with a crystalline imogolite, it is considered to accordingly possess the imogolite structure. Accordingly, a protoimogolite possesses a similar adsorbent property as with an imogolite in a low-humidity range.

Meanwhile, a layered clay mineral also yields superior adsorption performance. Bentonite (mineral name of montmorillonite), which is swelling clay that is mainly used as a waterproofing agent, is known to well up to approximately 10 times relative to water adsorption. It is also known to possess a certain level of water vapor adsorption performance.

As described above, the unique shape and physical properties of an imogolite as the nano-sized tubular aluminum silicate and the layered clay mineral are considered to be industrially useful. In other words, since an imogolite and a layered clay mineral are characterized in being able to adsorb various substances based on their unique microstructure, for instance, it has been conventionally said that an imogolite and a layered clay mineral have application potency as a hazardous contaminant adsorbent, a deodorant, and the like. In addition, since an imogolite yields superior water vapor adsorption performance, its application as a heat exchange material for heat pump, a dew condensation prevention agent, an autonomous humidity control material and the like is also expected. Meanwhile, since a layered clay mineral that is known from the past also has water vapor adsorption performance, the improvement of such performance is expected.

In particular, since desiccant air conditioning aims to eliminate the moisture content in the air that is introduced from the outside air, it is required to efficiently eliminate the moisture content even from the high humidity air in the summer, and the adsorbent that is sought in the desiccant air conditioning is generally demanded of a high adsorption amount at a relative humidity of roughly 5% to 60%, but a higher adsorption performance in a high humidity range is also desirable.

Under the foregoing circumstances, the mass synthesis at an industrially inexpensive cost is being demanded while possessing the foregoing characteristics of the tubular aluminum silicate. Nevertheless, with only the amorphous substance including an imogolite structure that has been clarified with the NMR measurement, an adsorption performance that is approximately 1.2 to 1.5 times better in comparison to zeolite or silica gel could only be achieved. In giving consideration to the miniaturization of a desiccant air conditioner based on the foregoing background, the synthesis of an adsorbent having an adsorption performance that is twice or higher in comparison to existing materials is required.

Conventionally, adsorbents utilizing the unique fine pores of an amorphous substance utilizing an imogolite or a protoimogolite which becomes an imogolite when it is heated at approximately 100° C. have been developed (refer to Patent Documents 1 and 2). Nevertheless, with these conventional methods, it was not possible to achieve an adsorption performance of 45 wt % or more at a relative humidity of 60% in a water vapor adsorption isotherm.

In addition, adsorbents utilizing an amorphous aluminum silicate having a Si/Al ratio of 0.7 to 1.0, and peaks in the vicinity of −78 ppm and −87 ppm in a $^{29}$Si solid state NMR spectrum have been developed (refer to Patent Documents 3 and 4). Nevertheless, with these methods also, it was not possible to achieve an adsorption performance of 45 wt % or more at a relative humidity of 60% in a water vapor adsorption isotherm.

Meanwhile, among the technologies concerning the collection or separation of gases that are being developed pursuant to their objective and use, separation/collection technology of carbon dioxide is becoming an important subject from the perspectives including the issue of global warming.

In the methods of collecting carbon dioxide from dry gas, adsorbents of porous materials such as silica gel, alumina, zeolite, activated carbon, and diatomite, as well as silica, calcium oxide, sodium oxide, potassium oxide, iron oxide and the like are being used (refer to Patent Documents 5 and 6).

Moreover, with a majority of the pressure swing adsorption methods of carbon dioxide, zeolite 13X is being used as the adsorbent (refer to Non-patent Document 1). Zeolite 13X yields a superior adsorption amount of carbon dioxide in a range of roughly 0 to 2 atmospheres. Nevertheless, to desorb the adsorbed carbon dioxide for use as an effective pressure swing adsorbent, there is a problem in that vacuuming need to be performed and the pressure needs to be 0.2 atmospheres or less.

[Patent Document 1] Japanese Published Unexamined Application No. 2001-064010
[Patent Document 2] Japanese Published Unexamined Application No. 2006-240956
[Patent Document 3] Japanese Published Unexamined Application No. 2008-179533
[Patent Document 4] Japanese Patent Application No. 2008-224574
[Patent Document 5] Japanese Published Unexamined Application No. 2003-019435
[Patent Document 6] Japanese Published Unexamined Application No. 2005-040753
[Non-Patent Document 1] New Handbook on Adsorption Technology, published by NTS (1999) pages 133 to 140

DISCLOSURE OF THE INVENTION

Problems which the Invention Intends to Solve

The present invention was devised in view of the foregoing circumstances. Thus, an object of this invention is to provide a material that yields superior adsorption performance in a mid humidity range, an adsorbent having such superior adsorption properties, and in particular to provide an adsorbent for desiccant air conditioning as well as for adsorbing gas such as formaldehyde.

An additional object of this invention is to provide an adsorbent that is capable of effectively desorbing carbon dioxide, which was adsorbed at a pressure of atmospheric pressure or higher by increasing the pressure, merely by lowering the pressure without vacuuming even at atmospheric pressure or higher. In particular, an object of the present invention is to provide an adsorbent for use in the pressure swing adsorption (PSA) method.

Means for Solving the Problems

To achieve the foregoing objects, the present inventors examined heating and synthesizing, at 110° C. or higher, an amorphous aluminum silicate partially containing the same structure as imogolite as the bonding state of Si and Al based on the phenomenon that pure imogolite must be synthesized at a temperature that is less than 110° C. Consequently, the present inventors succeeded in developing a synthesis method of a substance made of a complex of a layered low-crystalline clay mineral and an amorphous aluminum silicate that yields a superior adsorption performance in the mid and the high humidity range, and thereby completed the present invention.

Specifically, to achieve the foregoing object, the present invention provides:
[1] An aluminum silicate complex comprising a layered low-crystalline clay mineral and an amorphous aluminum silicate.
[2] The aluminum silicate complex according to [1] above, characterized in having four broad peaks in the vicinity of $2\theta=20, 26, 35, 39°$ in a powder X-ray diffraction pattern using Cu as an X-ray source.
[3] The aluminum silicate complex according to [1] or [2] above, characterized in having peaks in the vicinity of −78 ppm and in a range of −84 to −94 ppm in a $^{29}Si$ solid state NMR spectrum.
[4] The aluminum silicate complex according to any one of [1] to [3] above, characterized in that the aluminum silicate complex is obtained by mixing a monosilicic acid aqueous solution and an aluminum solution so that the Si/Al ratio becomes 0.7 to 1.0, adjusting the pH to 6 to 8 by adding acid or alkali, and thereafter heating a product that was subject to desalination treatment at 110° C. or higher.
[5] An adsorbent characterized in comprising the aluminum silicate complex according to any one of [1] to [4] above.
[6] The adsorbent according to [5] above, characterized in that the amount of water vapor adsorption is 45 wt % or more at a relative humidity of 60%.
[7] An adsorbent for desiccant air conditioning characterized in comprising the aluminum silicate complex according to any one of [1] to [4] above.
[8] A carbon dioxide adsorbent characterized in comprising the aluminum silicate complex according to any one of [1] to [4] above.
[9] The carbon dioxide adsorbent according to [8] above, characterized in that the carbon dioxide adsorbent is an adsorbent for adsorbing and desorbing carbon dioxide in dependence on pressure, and the adsorbable/desorbable amount in 1 atmosphere (atmospheric pressure) to 10 atmospheres is 12 wt % or more.
[10] A gas adsorbent characterized in comprising the aluminum silicate complex according to any one of [1] to [4] above.

Effect of the Invention

The complex of the layered low-crystalline clay mineral and the amorphous aluminum silicate obtained in the present invention yields a superior water vapor adsorption performance of 45 wt % or more at a relative humidity of 60% and can be dewatered at a temperature of approximately 80° C., and therefore can be used as an adsorbent for desiccant air conditioning. Moreover, this complex yields a superior carbon dioxide adsorption/desorption performance of 12 wt % or more at 100 kPa to 900 kPa, and can be used as a carbon dioxide adsorbent. This complex can be additionally used as a gas adsorbent of ammonia, formaldehyde and the like, an adsorbent of harmful contaminants, a deodorant, and as a gas storage material of methane and the like.

BEST MODE FOR CARRYING OUT THE INVENTION

The present invention is now explained in further detail. Of the substance comprising the complex of the layered low-crystalline clay mineral and the amorphous aluminum silicate according to the present invention, the amorphous aluminum silicate is a hydrated aluminum silicate which has, as its primary constituent elements, silicon (Si), aluminum (Al), oxygen (O) and hydrogen (H), and is assembled from numerous Si—O—Al bonds. The layered low-crystallinity clay mineral is a layered clay mineral gibbsite formed of a single or several layers of aluminum hydroxide and hardly containing the regular lamination of the layers.

The complex of the layered low-crystalline clay mineral and the amorphous aluminum silicate can be artificially obtained by mixing an inorganic silicon compound solution and an inorganic aluminum compound solution so that the Si/Al ratio becomes 0.7 to 1.0, adjusting pH to be 6 to 8 by adding acid or alkali to obtain a precursor product, subjecting the precursor product to desalination treatment, and thereafter heating the desalinated precursor product at 110° C. or higher.

In the present invention, the complex of the layered low-crystalline clay mineral and the amorphous aluminum silicate yields a performance of adsorbing water vapor of 45 wt % or more at a relative humidity of 60%, and its adsorbable/desorbable amount in 1 atmosphere (atmospheric pressure) to 10 atmospheres is 12 wt % or more. This is a substance that possesses high adsorption properties that is different from an imogolite conventionally known as a tubular aluminum silicate, a protoimogolite which becomes an imogolite when heated at approximately 100° C., or an amorphous aluminum silicate.

Specifically, as a result of intense study, the present inventors discovered that it is possible to obtain a substance that yields a superior water vapor hygroscopic behavior, which could not be conventionally obtained, by adjusting the precursor at a composition ratio in which the composition of an amorphous aluminum silicate and the composition of a layered low-crystalline clay mineral are mixed, heating this at a temperature range which forms a layered low-crystalline clay, and thereby obtaining a complex of a layered low-crystalline clay mineral and an amorphous aluminum silicate.

In the present invention, under normal circumstances, an inorganic silicon compound and an inorganic aluminum compound are used as the raw material when preparing a complex precursor substance prior to heating.

The reagent to be used as the silicon source will suffice so as long as it is a silicate, and specifically sodium orthosilicate, sodium metasilicate, amorphous colloidal silicon dioxide (Aerosil, etc.) and the like can be listed as preferable choices.

In addition, the aluminum source to be bonded with the foregoing silicate molecules will suffice so as long as it is an aluminum ion, and specifically aluminum compounds such as aluminum chloride, aluminum nitrate, aluminum sulfate and sodium aluminate can be listed as preferable choices. The foregoing silicon source and aluminum source are not limited to the foregoing compounds, and other sources that yield the same effects can also be used.

These raw materials are dissolved in an appropriate aqueous solution to prepare a solution of a prescribed concentration. In order to synthesize a complex that shows superior adsorption behavior that satisfies the object of this invention, it is necessary to perform the mixing so that the silicon/aluminum ratio becomes 0.7 to 1.0. The concentration of the silicon compound in the solution is 1 to 500 mmol/L and the concentration of the aluminum compound solution is 1 to 1000 mmol/L, but as a preferable concentration it is desirable to mix 1 to 300 mmol/L of silicon compound solution and 1 to 500 mmol/L of aluminum compound solution. The silicon compound solution is mixed with the aluminum compound solution based on the foregoing ratios and concentrations, and, after forming the precursor and adjusting the pH to 6 to 8 by adding acid or alkali, the coexisting ions in the solution are eliminated by way of centrifugal separation, filtration, membrane separation and the like. Subsequently, the collected precursor is dispersed in an aciduous to mildly alkaline aqueous solution, whereby the produced solid content is the suspension containing the precursor substance to become the complex of the layered low-crystalline clay mineral and the amorphous aluminum silicate.

The suspension containing the precursor substance is heated at 110° C. or higher to create a complex of the layered low-crystalline clay mineral and the amorphous aluminum silicate, and a superior adsorbent having the aimed adsorption properties for water vapor and carbon dioxide can thereby be obtained.

EXAMPLES

The present invention is now specifically explained based on the Examples and Comparative Examples, but shall not be limited in any way by the following Examples.

Example 1

100 mL of a 360 mmol/L sodium orthosilicate aqueous solution was used as the Si source, and 100 mL of a 450 mmol/L aluminum chloride aqueous solution was used as the Al source. The sodium orthosilicate aqueous solution was added to the aluminum chloride aqueous solution and agitated for approximately 10 minutes. Here, the Si/Al ratio was 0.80. After the agitation, 1N sodium hydroxide aqueous solution was dropped at a rate of 1 mL/minute and added until the pH reached approximately 6. The amount of sodium hydroxide aqueous solution that was dropped was 6 mL. The precursor suspension prepared as described above was subject to desalination treatment once with centrifugation. The desalination treatment was performed with a centrifuge at a rotation rate of 3000 rpm for 10 minutes. The precursor that was subject to desalination treatment was dispersed in deionized water so that it will be 1 L in total, and this was agitated for 10 minutes to prepare a precursor suspension.

70 mL of the adjusted 1 L imogolite precursor suspension was measured and placed in a 100 mL Teflon (registered trademark) container, subsequently placed in a stainless rotating reaction container, and heated at 120° C. for 2 days. After the reaction, the precursor suspension was cleaned 3 times with centrifugation, and dried at 60° C. for 1 day.

Figure 1:
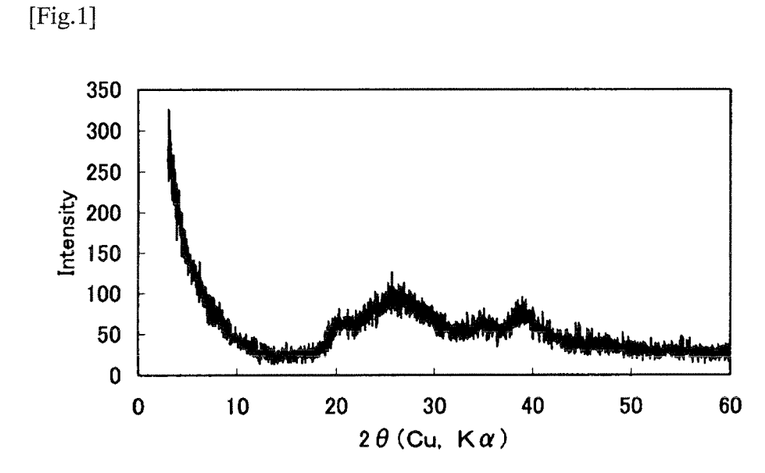
FIG. 1 a diagram showing the powder X-ray diffraction pattern of Example 1
FIG. 2 a diagram showing the $^{29}Si$ solid state NMR spectrum of Example 1
FIG. 3 a diagram showing the powder X-ray diffraction pattern of Comparative Example 1
FIG. 4 a diagram showing the $^{29}Si$ solid state NMR spectrum of Comparative Example 1
FIG. 5 a diagram showing the water vapor adsorption isotherm of Example 1, Comparative Example 1 and Comparative Example 2
FIG. 6 a diagram showing the curve of the amount of carbon dioxide absorption/desorption of Example 1 and Comparative Example 3 based on vacuum pressure
FIG. 7 a diagram showing the curve of the amount of carbon dioxide absorption/desorption of Example 1 and Comparative Example 3 based on atmospheric pressure

The obtained product was subject to powder X-ray diffraction measurement. FIG. 1 shows the powder X-ray diffraction pattern of the obtained product.

As shown in FIG. 1, broad peaks are visible in the vicinity of 2θ=20, 26, 35, 40°. Among the above, the peaks seen at 20 and 35° are obtained from the reflection of the hk0 face of the layered clay mineral, and, since the 00l reflection that is generally seen in a layered clay mineral is not visible, it is assumed that this is a layered low-crystalline clay mineral without any thickness in the laminate direction. In addition, the broad peaks in the vicinity of 2θ=26, 40° are peaks characteristic to an amorphous aluminum silicate. Based on the foregoing results, it has been confirmed that the substance of Example 1 is made of a layered low-crystalline clay mineral and an amorphous aluminum silicate.

Figure 2:
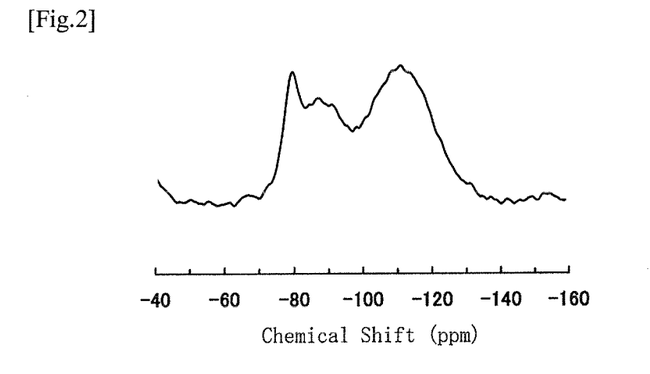

Moreover, the product obtained in Example 1 was subject to $^{29}Si$ solid state NMR measurement. FIG. 2 shows the spectrum based on the $^{29}Si$ solid state NMR measurement of the obtained product.

The substance obtained in Example 1 showed peaks in the vicinity of −78 ppm, −86 ppm and −91 ppm. The peak visible in the vicinity of −78 ppm shows a structure characteristic to imogolite and protoimogolite, and the peaks visible in the vicinity of −86 ppm and −91 ppm are peaks that can be seen in a layered silicate.

Example 2

100 mL of a 360 mmol/L sodium orthosilicate aqueous solution was used as the Si source, and 100 mL of a 424 mmol/L aluminum chloride aqueous solution was used as the Al source. The sodium orthosilicate aqueous solution was added to the aluminum chloride aqueous solution and agitated for approximately 10 minutes. Here, the Si/Al ratio was 0.85. After the agitation, 1N sodium hydroxide aqueous solution was dropped at a rate of 1 mL/minute and added until the pH reached approximately 6. The amount of sodium hydroxide aqueous solution that was dropped was 6.3 mL. The precursor suspension that was prepared as described above was subject to desalination treatment once with centrifugation. The desalination treatment was performed with a centrifuge at a rotation rate of 3000 rpm for 10 minutes. The precursor that was subject to desalination treatment was dispersed in deionized water so that it will be 1 L in total, and this was agitated for 10 minutes to prepare a precursor suspension.

70 mL of the adjusted 1 L imogolite precursor suspension was measured and placed in a 100 mL Teflon (registered trademark) container, subsequently placed in a stainless rotating reaction container, and heated at 180° C. for 18 hours. After the reaction, the precursor suspension was cleaned 3 times with centrifugation, and dried at 60° C. for 1 day.

The obtained product was subject to powder X-ray diffraction measurement. As with Example 1, broad peaks were visible in the vicinity of 2θ=20, 26, 35, 40°.

Comparative Example 1

The same precursor suspension solution was heated at 100° C. for 2 days and used as Comparative Example 1, and the amorphous aluminum silicate of Comparative Example 1 was obtained as follows.

100 mL of a 0.36 mol/L sodium orthosilicate aqueous solution was used as the Si source, and 100 mL of a 0.45 mol/L aluminum chloride aqueous solution was used as the Al source. The sodium orthosilicate aqueous solution was added to the aluminum chloride aqueous solution and agitated for approximately 10 minutes. Here, the Si/Al ratio was 0.80. After the agitation, 1N sodium hydroxide aqueous solution was dropped at a rate of 1 mL/minute and added until the pH reached approximately 6. The amount of sodium hydroxide aqueous solution that was dropped was 6 mL. The precursor suspension that was prepared as described above was subject to desalination treatment once with centrifugation. The desalination treatment was performed with a centrifuge at a rotation rate of 3000 rpm for 10 minutes. The precursor that was subject to desalination treatment was dispersed in deionized water so that it will be 1 L in total, and this was agitated for 10 minutes to prepare a precursor suspension.

70 mL of the adjusted 1 L imogolite precursor suspension was measured and placed in a 100 mL Teflon (registered trademark) container, subsequently placed in a stainless rotating reaction container, and heated at 100° C. for 2 days. After the reaction, the precursor suspension was cleaned 3 times with centrifugation, and dried at 60° C. for 1 day.

Figure 3:
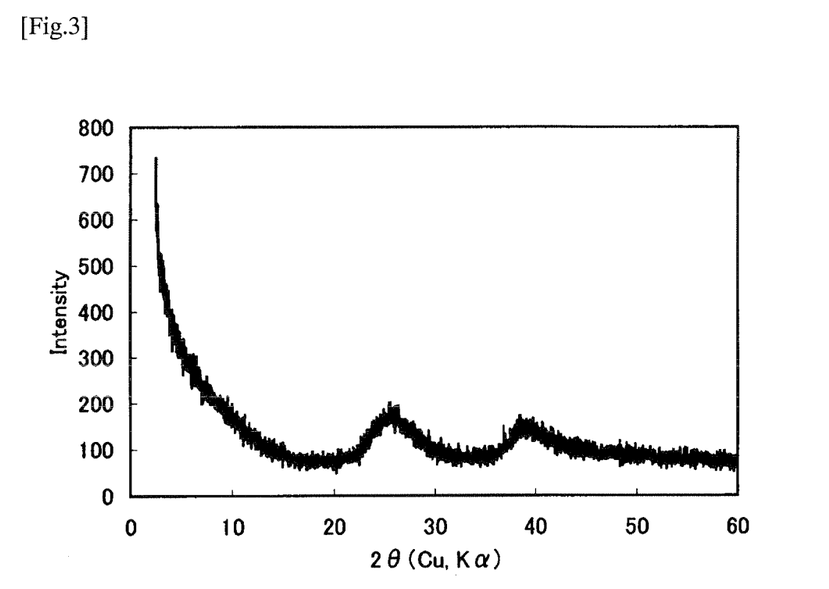

The obtained product was subject to powder X-ray diffraction measurement. FIG. 3 shows the powder X-ray diffraction pattern of the obtained product.

As shown in FIG. 3, broad peaks are visible in the vicinity of 2θ=26, 35, 40°. The broad peaks in the vicinity of 2θ=26, 40° are peaks characteristic to an amorphous aluminum silicate. Based on the foregoing results, it has been confirmed that the substance of Comparative Example 1 is made of an amorphous aluminum silicate.

Figure 4:
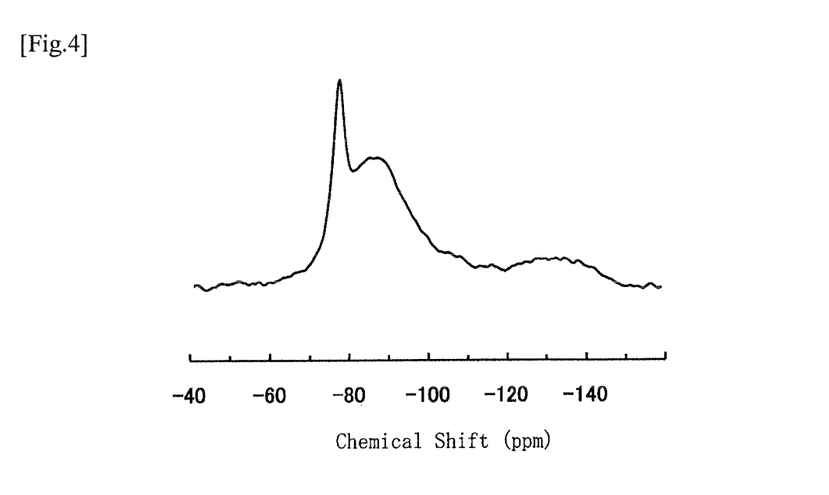
Figure 5:
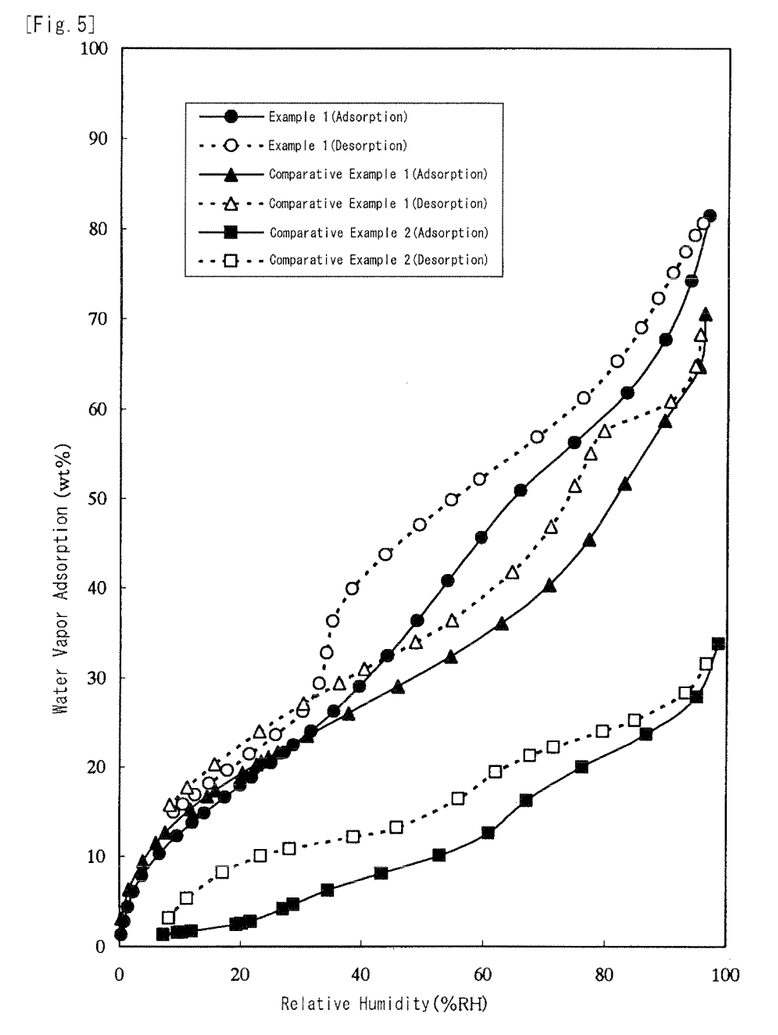

Moreover, the product obtained in Comparative Example 1 was subject to $^{29}Si$ solid state NMR measurement. FIG. 4 shows the spectrum based on the $^{29}Si$ solid state NMR measurement of the obtained product.

The substance obtained in Comparative Example 1 showed peaks in the vicinity of −78 ppm and −85 ppm. The peak visible in the vicinity of −78 ppm shows a structure characteristic to imogolite and protoimogolite, and it is assumed that the peak visible in the vicinity of −85 ppm is a peak that can be seen in a layered silicate.

(Evaluation of Water Vapor Adsorption)

Water vapor adsorption was evaluated from a water vapor adsorption isotherm obtained by measuring, using Belsorp 18 manufactured by Bel Japan, Inc., the complex of the layered low-crystalline clay mineral and the amorphous aluminum silicate obtained in Example 1, the amorphous imogolite obtained in Comparative Example 1, and the synthetic montmorillonite used as Comparative Example 2.

The adsorbed amount of the complex of the layered low-crystalline clay mineral and the amorphous aluminum silicate obtained in Example 1 was 46.1 wt % at a relative humidity of 60%. Meanwhile, the adsorbed amount of the imogolite of Comparative Example 1 was 34.8 wt % at a relative humidity of 60%, and the adsorbed amount of the synthetic montmorillonite of Comparative Example 2 was 12.2 wt % at a relative humidity of 60%.

Based on the foregoing adsorption evaluation, it has been discovered that the water vapor adsorption performance of the substance obtained in Example 1 cannot be obtained by mixing the amorphous aluminum silicate and the layered clay mineral, and can only be obtained by forming a complex of the two substances.

Further, as a result of the Examples, it has been confirmed that the complex of the layered low-crystalline clay mineral and the amorphous aluminum silicate yields an adsorption performance of 45 wt % or more at a relative humidity of 60%.

(Evaluation as an Adsorbent for Desiccant Air Conditioning)

As an adsorbent for desiccant air conditioning, it must yield a high adsorbed amount at a temperature of 25° C. and a relative humidity of 60%, and must be recyclable at a low temperature. The following measurements were performed for the evaluation of an adsorbent for desiccant air conditioning.

After measuring the weight of an empty weighing bottle, approximately 0.3 g of powder sample was placed in the weighing bottle, the weighing bottle was placed in a drier set to 100° C. for 1 hour to dry, and the weight was measured to seek the dry weight. Subsequently, the sample that was dried at 100° C. was placed in a constant temperature and humidity bath set to 25° C. and a relative humidity of 60% for 1 hour to adsorb water vapor, and the weight was subsequently measured to seek the amount of water absorption. In addition, the sample was placed in a drier set to 80° C. for 1 hour and dried, and the weight was measured to seek the dewatered amount. The adsorption ratio was sought based on amount of water absorption/dry weight and the dewatering ratio was sought based on dewatered amount/amount of water absorption. The water absorption ratio and the dewatering ratio of Example 1, Example 2, and Comparative Example 1 are shown in Table 1.

TABLE 1

|  | Example 1 | Example 2 | Comparative Example 1 |
|---|---|---|---|
| Adsorption Ratio (wt %) | 43.2 | 43.4 | 28.3 |
| Dewatering Ratio (%) | 93.2 | 92.8 | 91.9 |

As shown above, 90% or more of the water that was adsorbed was dewatered at 80° C., and it was discovered that the sample is suitable as an adsorbent for desiccant air conditioning.

(Evaluation of Carbon Dioxide Adsorption/Desorption)

The complex of the layered low-crystalline clay mineral and the amorphous aluminum silicate obtained in Example 1 and commercially available zeolite 13X was used as Comparative Example 3. The adsorption and desorption amounts were measured using Belsorp 18 manufactured by Bell Japan, Inc. at a temperature of 25° C., pressure of 0 to 900 kPa, and equilibrium time of 300 seconds.

Moreover, as the pretreatment of the foregoing measurement, vacuuming was performed at 110° C. for 2 hours.

Figure 6:
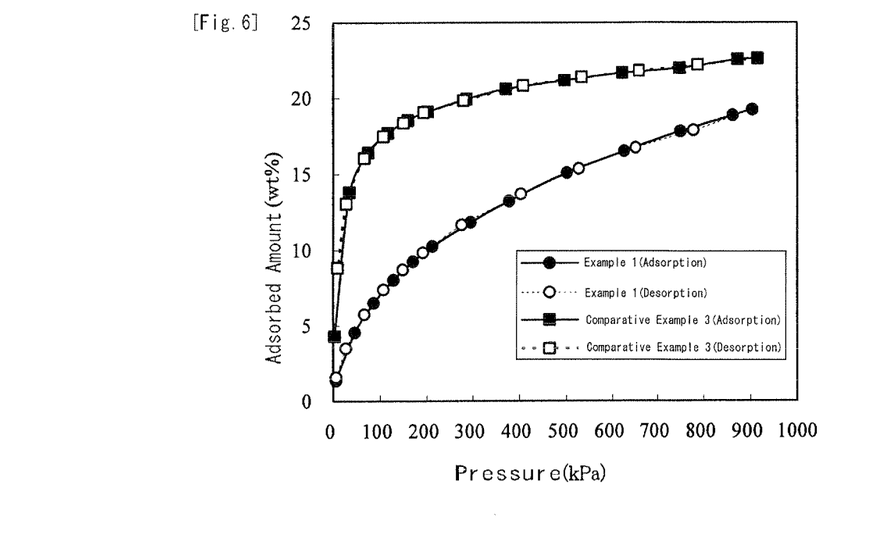
Figure 7:
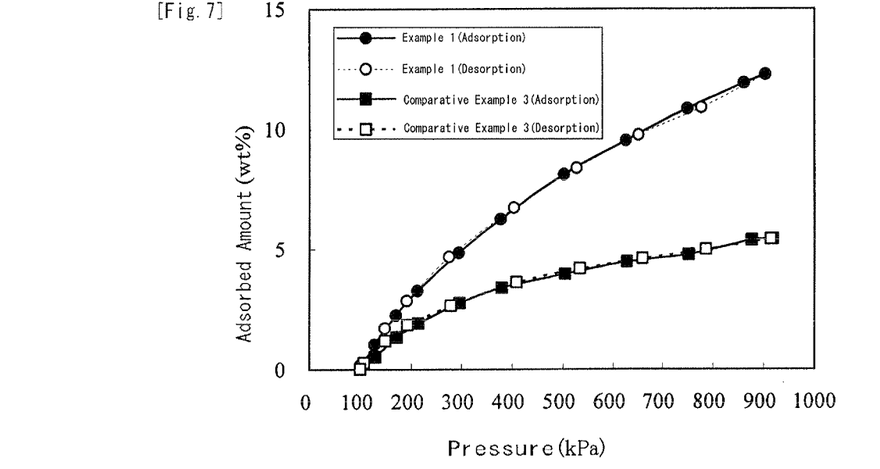

The pressure and adsorbed amount based on the vacuum pressure obtained as the measurement results are shown in FIG. 6. And the pressure and adsorbed amount based on atmospheric pressure are shown in FIG. 7.

As evident from FIG. 6, the complex of the layered low-crystalline clay mineral and the amorphous aluminum silicate yielded an adsorbed amount of 12.2 wt % in a pressure range of 100 to 900 kPa during carbon dioxide adsorption, and the adsorbed amount of 100 kPa during desorption yielded a value of 0.1 wt % when based on the adsorbed amount of 100 kPa during adsorption, and showed that there is hardly any hysteresis. In light of the above, it has been shown that the complex of the layered low-crystalline clay mineral and the amorphous aluminum silicate yielded an adsorbable/desorbable amount of 12 wt % or more at 100 kPa to 900 kPa.

Meanwhile, the zeolite 13X of Comparative Example 3 yielded an adsorbed amount of 5.4 wt % in a pressure range of 100 to 900 kPa during the carbon dioxide adsorption.

Accordingly, the complex of the layered low-crystalline clay mineral and the amorphous aluminum silicate yielded an adsorbable/desorbable amount at 100 kPa to 900 kPa which was nearly double the zeolite 13X.

INDUSTRIAL APPLICABILITY

The present invention provides a complex of a layered low-crystalline clay mineral and an amorphous aluminum silicate having excellent adsorption properties in mid and high humidity ranges, and, in addition to use as a dehumidifying agent for desiccant air conditioning a pressure swing carbon dioxide adsorbent, it is also useful as a gas adsorbent of ammonia, formaldehyde and the like.

The invention claimed is:

1. A complex comprising a layered low-crystallinity clay mineral and an amorphous aluminum silicate, wherein the complex having four broad peaks centered at about $2\theta=20, 26, 35, 39°$ in a powder X-ray diffraction pattern obtained by using $CuK_\alpha$ as an X-ray source.

2. The complex according to claim 1, wherein the complex having peaks centered at about −78 ppm and in a range of −84 to −94 ppm in a $^{29}Si$ solid state NMR spectrum.

3. The complex according to claim 1, wherein the complex is obtained by mixing a monosilicic acid aqueous solution and an aluminum solution so that the Si/Al ratio becomes 0.7 to 1.0, adjusting pH to be 6 to 8 with acid or alkali to obtain a precursor product, subjecting the precursor product to desalination treatment, and thereafter heating the desalinated precursor product at 110° C. or higher.

* * * * *